United States Patent [19]

Townsend

[11] 4,254,151
[45] Mar. 3, 1981

[54] METHOD FOR INJECTING FLUIDS INTO MEAT PRODUCTS

[75] Inventor: Ray T. Townsend, Des Moines, Iowa

[73] Assignee: Townsend Engineering Company, Des Moines, Iowa

[21] Appl. No.: 109,820

[22] Filed: Jan. 7, 1980

[51] Int. Cl.³ .......................... A23L 1/272; A23L 1/31
[52] U.S. Cl. ........................................ 426/231; 17/51; 99/487; 99/532; 99/533; 426/264; 426/281 426/652
[58] Field of Search ............... 426/262, 264, 281, 652, 426/513, 231; 17/25, 51; 99/487, 516, 532, 533, 535

[56] References Cited

U.S. PATENT DOCUMENTS

| | | |
|---|---|---|
| 2,796,017 | 6/1957 | Schmidt ................................. 99/533 |
| 3,370,959 | 2/1968 | Moore et al. ........................ 426/281 |
| 3,576,158 | 4/1971 | Greenspan ...................... 426/281 X |
| 3,919,931 | 11/1975 | Liljenberg ............................. 99/533 |
| 3,922,357 | 11/1975 | Townsend ........................ 99/533 X |
| 4,029,824 | 6/1977 | Langen ................................ 426/281 |
| 4,142,000 | 2/1979 | Townsend ........................ 99/535 X |

Primary Examiner—Arthur L. Corbin
Attorney, Agent, or Firm—Zarley, McKee, Thomte, Voorhees & Sease

[57] ABSTRACT

A plurality of needles is injected into a food product to create a plurality of cavity voids in said product, and a metered quantity of fluid is injected through said needles into said cavity voids while said needles are within said food product, said quantity of fluid being metered to be equal substantially to the volume of said cavity voids.

8 Claims, 9 Drawing Figures

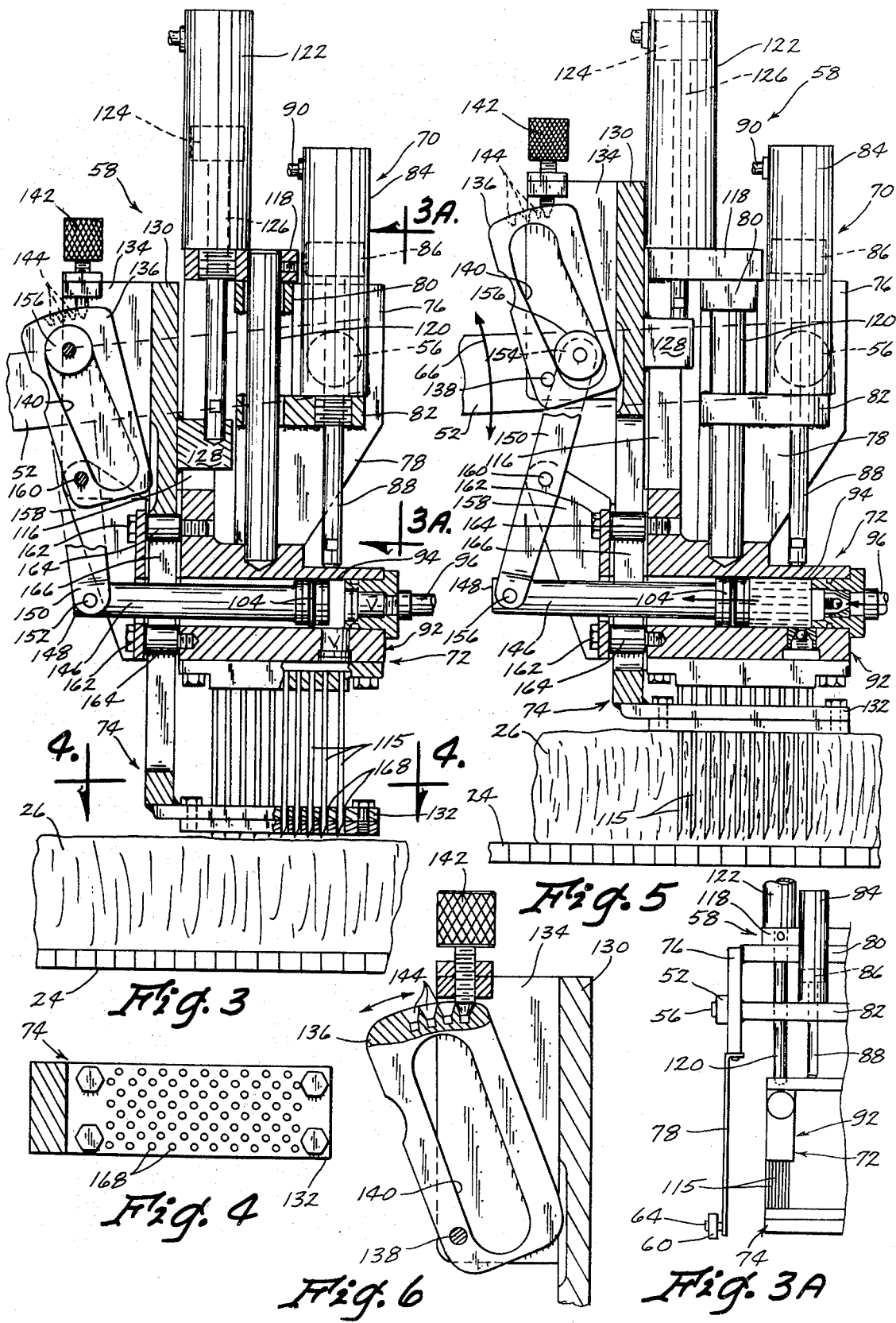

METHOD FOR INJECTING FLUIDS INTO MEAT PRODUCTS

BACKGROUND OF THE INVENTION

This invention relates to an improved method and means for injecting fluids into meat, fish or poultry products.

The processing of meat products often involves the injection of a brine fluid therein to aid the curing of the meat product.

Prior devices for injecting fluids into meat include a plurality of needles mounted upon a vertically reciprocating head. A conveyor moves the meat below the needles, and stops the movement of the meat. The needles then move downwardly to penetrate the meat. While they penetrate the meat they inject fluid into the meat and then are withdrawn. The meat is then conveyed further and the process is repeated.

Certain problems have occurred in prior art devices. One problem pertains to the intermittent movement of the meat. The starting and stopping of the conveyor for moving the meat slows the injection process and further requires additional equipment for sensing the position of the meat and for timing the intermittent movement of the conveyor carrying the meat.

Variations in the uniformity of the distribution of the fluid throughout the meat product creates a further problem in existing meat injection methods. These variations are created in large measure by the character of the meat product itself because the fluid easily migrates through the lean meat but not through the fat portions.

Another problem is encountered with prior art devices in properly metering the amount of liquid or fluid which is injected into the meat. Often the amount of fluid is greater than the amount needed, resulting in spillage and overflow, thereby making it more difficult to maintain sanitary standards. Such excess fluid also detracts from the appearance of the meat product.

Another problem encountered with the metering of the fluid is the difficulty in providing the proper amount of fluid when the thickness of the meat varies. Thicker portions of meat require a greater amount of fluid to be injected, whereas thinner portions of meat require a lesser amount. Similarly, when the needles strike bones or other impenetrable objects in the meat, they do not penetrate fully, and the present metering devices do not satisfactorily accommodate these varying depths of penetration.

Difficulty is also encountered with present devices in avoiding breakage of the needles when the needles strike bone or other hard matter in the meat. The breakage of needles can shut down the processing operation and thereby be detrimental to the efficiency of the operation.

SUMMARY OF THE INVENTION

The present invention provides an improved method and means for injecting fluids into the meat, fish or poultry products. The needle head of the present invention is controlled by cam means for permitting the head to move in unison with the meat on the conveyor so that the conveyor does not need to start and stop intermittently to receive the needles.

A plurality of needle heads are provided on the injecting device and are independently movable with respect to one another so that they may penetrate to different depths in the meat depending upon variances in the meat's thickness and in bones found in the meat. Each needle head includes a metering device for metering the fluid in response to the depth of needle penetration. The volume of fluid metered corresponds approximately to the volume of the cavities formed by the needles in the meat.

The device includes means for adjusting the fluid volume depending upon the depth to which the needles penetrate the meat. If the needles strike a bone and do not penetrate fully, the amount of fluid metered is automatically adjusted according to the depth of the cavities formed by the needles. Similarly, the fluid metered is approximately equal to the volume of the cavities of the needles regardless of how thick the meat is and how deep the needles penetrate the meat.

The fluid is drawn into a metering cylinder during the downward stroke of the needles and is expelled during withdrawal. This permits the device to sense the depth to which the needles penetrate the meat and to meter the fluid to correspond to the volume of the needle cavities for the particular depth to which the meat is penetrated.

Therefore, a primary object of the present invention is the provision of an improved method and means for injecting fluids into meat products.

The principal object of this invention is to provide a method and means for injecting fluid into a meat product or the like which will uniformly distribute the fluid upon injection in the meat product regardless of the lean/fat character of the meat product. A further and related object of the invention is to control the fluid injection in such a manner that quantities of fluid are uniformly injected into the fat and lean portions of meat without creating an immediate migration of fluid through the lean portions more than through the fat portions at the time of injection.

A further object of the present invention is the provision of a device which permits the needles to move in unison with the meat being conveyed so as to avoid intermittent starting and stopping of the conveyance of the meat.

A further object of the present invention is the provision of a device which meters fluid precisely to the volume of the cavity formed by the needles in the meat.

A further object of the present invention is the provision of a device which expels fluid only during the withdrawal of the needles from the meat, and which senses the depth to which the meat is penetrated during the downward stroke of the needles into the meat.

A further object of the present invention is the provision of a device which adjusts the fluid volume injected into the meat when the needles strike bones so that the volume of fluid is equal to the volume of the cavities of the needles when they do not penetrate as deeply as normal.

A further object of the present invention is the provision of a device which adjusts the volume of fluid metered to correspond to the needle volume even when the depth of the needles varies or when the thickness of the meat varies.

A further object of the present invention is the provision of a device having adjusting means for providing manual fine adjustment of the metering device.

A further object of the present invention is the provision of a device which includes a plurality of needle heads capable of penetrating independently of one another to varying depths across the meat width, depending upon meat thickness and the bones in the meat.

A further object of the present invention is the provision of a device which is economical to manufacture, durable in use and efficient in operation.

BRIEF DESCRIPTION OF FIGURES OF DRAWINGS

FIG. 3 is a sectional view taken along line 3—3 of FIG. 2.

FIG. 3A is a sectional view taken along line 3A—3A of FIG. 3.

FIG. 4 is a sectional view taken along line 4—4 of FIG. 3.

FIG. 5 is a sectional view similar to FIG. 3, but showing the needles fully penetrated into the meat.

FIG. 6 is an enlarged detailed view of the metering cylinder cam adjustment plate.

DETAILED DESCRIPTION OF THE INVENTION

Figure 1:
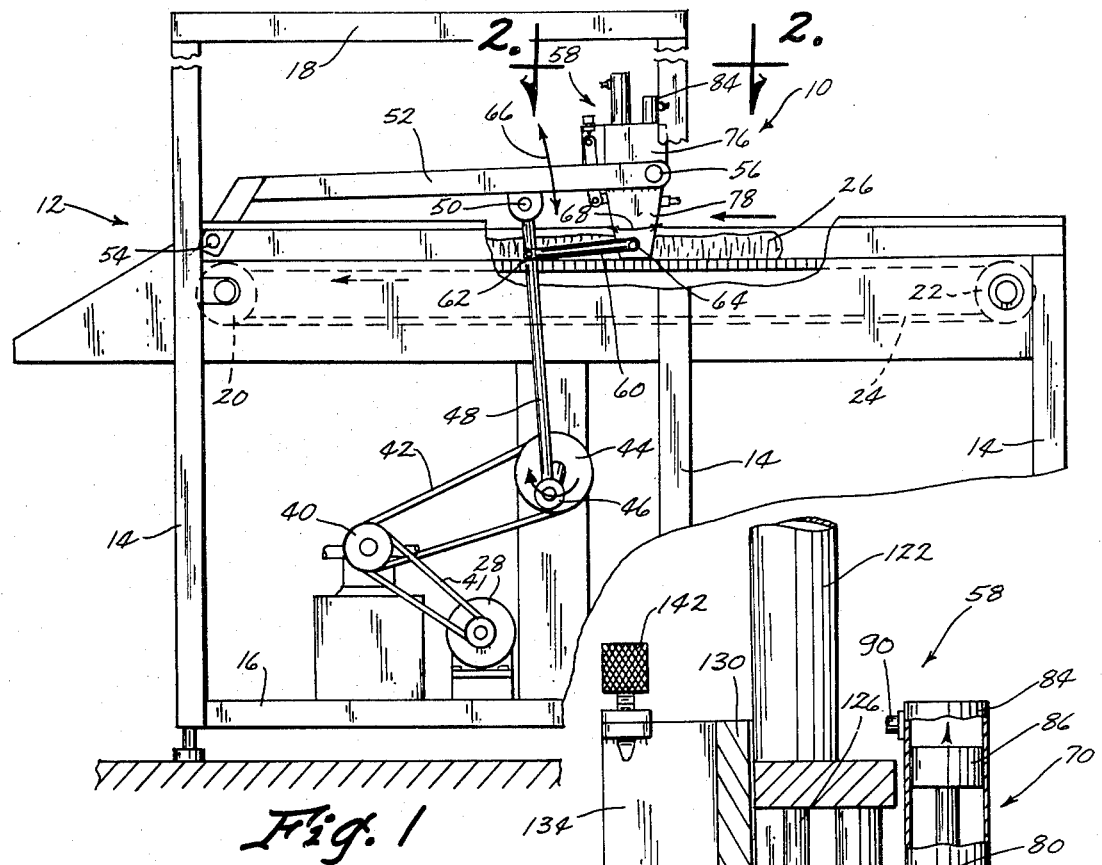
FIG. 1 is an elevational view of the device for injecting fluids of the present invention.

Referring to the drawings, the numeral 10 generally designates the injection machine of the present invention. Referring to FIG. 1, machine 10 includes a table frame 12, comprising a plurality of vertical legs 14, a plurality of horizontal bottom members 16, and a plurality of top frame members 18.

Rotatably mounted at opposite ends of table 12 are a pair of conveyor rollers 20, 22 which support a conveyor belt 24. Rollers 20, 22 and belt 24 are driven in conventional fashion and therefore the means for driving these conveyor elements is not shown. Belt 24 supports pieces of meat, fish or poultry 26, and moves continuously as opposed to the intermittent starting and stopping action found in prior art injection machines.

Mounted to the lower portion of table frame 12 is a motor 28 which by means of belts 41, 42 drives pulleys 40, 44. Pulley 44 includes a pivot bearing 46 located radially outwardly from the rotational center thereof so as to provide an eccentric mounting for the lower end of a vertical link 48. The upper end of vertical link 48 is pivotally mounted at 50 to an injector arm 52. One end of injector arm 52 is hinged for pivotal movement about an axis 54 and the opposite end of arm 52 is pivoted at 56 to an injector assembly designated generally by the numeral 58. A horizontal link 60 is pivoted at one of its ends to vertical link 48 for pivotal movement about axis 62 and is pivotally mounted at its opposite end to the lower end of injector assembly 58 for pivotal movement about an axis 64.

Rotation of larger pulley 44 causes reciprocating upward and downward movement of arm 52 about pivotal axis 54 so that injector assembly 58 is reciprocated upwardly and downwardly as indicated by arrow 66 in FIG. 1. At the same time, link 60 causes the lower end of injector assembly 58 to reciprocate in pivotal movement about axis 56 in the direction indicated by arrows 68 in FIG. 1. This reciprocating action caused by link 60 causes the lower end of injector assembly 58 to move horizontally in unison with meat 26 as meat 26 is being carried by conveyor belt 24. The timing of movement of arm 52 and link 60 is pre-arranged so that the lower end of injector assembly 58 moves to the left as viewed in FIG. 1 when arm 52 is in its lowermost position, and the lower end of injector assembly 58 is moved to the right as viewed in FIG. 1 when arm 52 is in its uppermost position so that needles of injector assembly 58 will clear meat 26 when the lower end of injector 58 moves to the right. This permits continuous movement of meat 26 as contrasted with the intermittent starting and stopping of meat 26 as in previous devices.

Referring to FIGS. 3, 5, 7, and 8, injector assembly 58 includes three sub-assemblies which are referred to for purposes of reference as a ram assembly 70, a needle assembly 72, and a stripper assembly 74. Ram assembly 70 is connected directly to arm 52 for pivotal movement about hinge axis 56. Ram assembly 70 includes an end plate 76 to which arm 52 is pivotally connected. End plate 76 includes a downwardly extending portion 78 which is pivotally connected at its lower end to link 60 for pivotal connection about axis 64. End plate 76 is welded or otherwise fixed to a pair of horizontal slide bars 80, 82 which extend transversely across the injector assembly 58 in vertical spaced apart relation to one another.

Fixed to the upper surface of horizontal slide bar 82 are a plurality of air spring cylinders 84 in which are mounted air spring pistons 86 and piston shafts 88. The upper end of cylinder 84 is provided with an air hose connection 90 for charging the upper portion of cylinder 84 with a predetermined amount of air pressure so that piston 86 is yieldably held against upward movement within cylinder 84, and so that piston 86 can overcome the force exerted by the air within the upper end of cylinder 84 whenever the upward pressure of piston 86 exceeds a predetermined force.

The lower end of piston shaft 88 abuts against the upper surface of a needle head 92 which is a part of needle assembly 72. Needle head 92 includes a cylindrical bore 94 extending horizontally therethrough. A fluid inlet connection 96 provides communication into the interior of cylinder 94 through a valve opening 98. A check valve 100 (FIG. 8) is biased outwardly toward valve opening 98 by means of a spring 102. Check valve 100 permits fluid to enter cylinder 94 when the pressure within fluid inlet 96 is greater than that within cylinder 94. However, check valve 100 prevents back flow of fluid from cylinder 94 to inlet 96.

A metering piston 104 is mounted within cylindrical bore 94 for reciprocating movement therein, and includes a sealing ring 106 around the outer margins thereof.

Cylindrical bore 94 is also provided with an outlet opening 108 which provides communication into a needle manifold 110. A check valve 112 is provided adjacent opening 108 and is biased toward opening 108 by a spring 114 in such a manner that fluid can flow from cylinder 94 into manifold 110 when the pressure within cylinder 94 is greater than the pressure within manifold 110, but a back flow of fluid from manifold 110 into cylinder 94 is prevented by check valve 112. A plurality of needles 115 each have open upper ends in communication with the interior of manifold 110 so as to receive fluid therefrom. The lower end of each needle 115 is pointed and includes an open end for permitting the fluid to pass from the manifold 110 outwardly through the lower end of needle 115.

Extending upwardly from cylinder head 92 is a vertical support member 116 which includes a horizontal flange 118 at its upper end. Operatively secured to flange 118 is a vertical slide bar 120 which has its upper end fixed to flange 118 and its lower end threaded or otherwise fixed to the upper surface of needle head 92. Ram assembly 70 is adapted for vertical sliding movement on vertical bar 120 by virtue of the slidable mounting of horizontal slide bars 80, 82 over vertical bar 120.

Mounted to the upper surface of horizontal flange 118 is a second air spring cylinder 122.

Stripper assembly 74 includes a piston 124 mounted for sliding movement within air spring cylinder 122. A piston rod 126 extends downwardly from piston 124 and is connected at its lower end to a flange 128 which in turn is fixed to a vertical plate 130. The lower end of vertical plate 130 has mounted thereon a stripper plate 132 having holes therein for slidably receiving needles 115.

Mounted to the upper end of vertical plate 130 is a cam plate frame 134 having a cam plate 136 pivotally mounted thereon for pivotal movement about an axis 138. Cam plate 136 includes a cam slot 140 formed therein.

An adjusting pin 142 is threaded to cam plate frame 134 and includes a lower end adapted to retentively fit within any of a plurality of notches 144 so as to hold cam plate 136 in any of a number of desired positions.

Metering piston 104 includes a piston rod 146 which extends outwardly from needle head 92 to a distal end 148. The distal end of rod 146 has pivotally mounted thereto a metering link 150 for pivotal movement about an axis 152. Link 150 has an upper end 154 upon which is rotatably mounted a roller bearing 156. Bearing 156 is mounted for rolling movement within cam slot 140 of cam plate 136.

Link 150 is also pivotally mounted at the approximate longitudinal center thereof to an ear flange 158 for pivotal movement about a fulcrum axis 160. Ear flange 158 is bolted to needle head 92 by a pair of bolts 162 which include roller bearings 164 mounted thereon, and which are threaded into cylinder head 92. Bearings 164 are fitted for sliding movement within a vertical slot 166 in vertical plate 130 of stripper assembly 74.

Figure 7:
FIG. 7 is a view similar to FIG. 5, but showing the needles in a partially penetrated position in engagement with a piece of bone in the meat.

The inter-relationship of ram assembly 70, needle assembly 72 and stripper assembly 74 is illustrated in FIGS. 3, 5, 7 and 8. FIG. 3 illustrates the relative position of the parts prior to the time that the needles commence their downward stroke. FIG. 5 illustrates the assembly in its fully depressed position. Arms 52 cause the movement of the device from the position of FIG. 3 to the position of FIG. 5. Downward movement of arms 52 is transferred to ram assembly 70 by virtue of the pivotal connection at hinge axis 56 between arms 52 and end plates 76. In moving from the position of FIG. 3 to FIG. 5, ram assembly 70 and needle assembly 72 move in unison with respect to one another. The downward pressure from ram assembly 70 is transferred to needle assembly 72 by virtue of the contact between the lower end of piston shaft 88 and the upper surface of needle head 92. The air pressure within the upper end of cylinder 84 acts as a spring which does not yield in response to normal pressure as the needles are depressed into the meat. However, FIG. 7 illustrates what happens if the needles encounter a bone or obstruction 172 in the meat.

When needles 115 engage a bone or obstruction 172, the upward pressure caused by the resistance of bone 172 is transferred through needle head 92 to piston shaft 88 and air spring piston 86. The air pressure in the upper portion of cylinder 84 is chosen so as to yield in response to this upward pressure caused by obstruction 172, and thus cylinder 86 moves upwardly within cylinder 84 against the pressure exerted by the air within the upper end of cylinder 84. Movement between ram assembly 70 and needle assembly 72 is permitted by virtue of the sliding engagement of vertical slide bar 120 with respect to horizontal slide bars 80, 82 of ram assembly 70. As illustrated in FIG. 7, needle assembly 72 remains stationary after needles 115 strike obstruction 172, but ram assembly 70 and horizontal slide bars 80, 82 continue downwardly with the driving force exerted by arms 52.

Stripper assembly 74 moves downwardly with the downward movement of arm 52 until stripper plate 132 engages the upper surface of the meat. Stripper plate 132 includes a plurality of openings 168 (FIG. 4) which surround needles 115 and permit needles 115 to slide downwardly therethrough.

When stripper plate 132 engages the upper surface of the meat, resistance caused by the meat to the downward movement of the stripper plate 132 is transferred upwardly through vertical plate 130 to cam plate frame 134 and cam plate 136. Piston 124 is driven upwardly within cylinder 122 against the air pressure which is within the upper cylinder of piston 122. The air pressure is chosen in a predetermined manner so that piston 124 will overcome the pressure in response to stripper plate 132 engaging the upper surface of the meat. However, prior to the time stripper plate 132 engages the meat, the air pressure within piston 122 forces stripper plate 132 to the position shown in FIG. 3.

The relative movement between stripper assembly 74 and needle assembly 72 causes the metering of fluid within cylindrical bore 94 in the following manner. When stripper plate 132 engages the upper portion of the meat, the downward movement of stripper plate 132 and cam plate 136 ceases, but the downward movement of needles 115 continues. This downward movement of needles 115 and distal end 148 of metering piston rod 146, causes roller bearing 156 to roll downwardly within cam slot 140 from the position shown in FIG. 3 to the position shown in FIG. 5. The downward movement of roller 156 causes metering link 150 to pivot about fulcrum 160 in a clockwise direction, thereby withdrawing piston 104 to the left as needed in FIG. 5. As piston 104 is withdrawn to the left, it draws fluid inwardly through check valve 100 and fills the portion of cylinder bore 94 to the right of piston 104. The stroke of piston 104 is controlled by the depth to which needles 115 protrude within the meat. This is true because the stroke of piston 104 is controlled by the relative movement between stripper assembly 74 and needle assembly 72. The greater the relative movement with respect to these two components, the greater the stroke of piston 104.

The stroke of piston 104 can also be adjusted prior to the operation of the machine by virtue of adjusting pin 142 and notches 144. Withdrawal of adjusting pin 142 permits cam plate 136 to be pivoted about axis 138 to any of a plurality of desired positions as illustrated in FIG. 6. The stroke of piston 104 and the pre-set position of cam plate 136 is chosen so as to cause the volume of fluid drawn into cylinder bore 94 to be substantially equal to the volume of the cavities in meat 26 caused by the plurality of needles 115.

Figure 8:
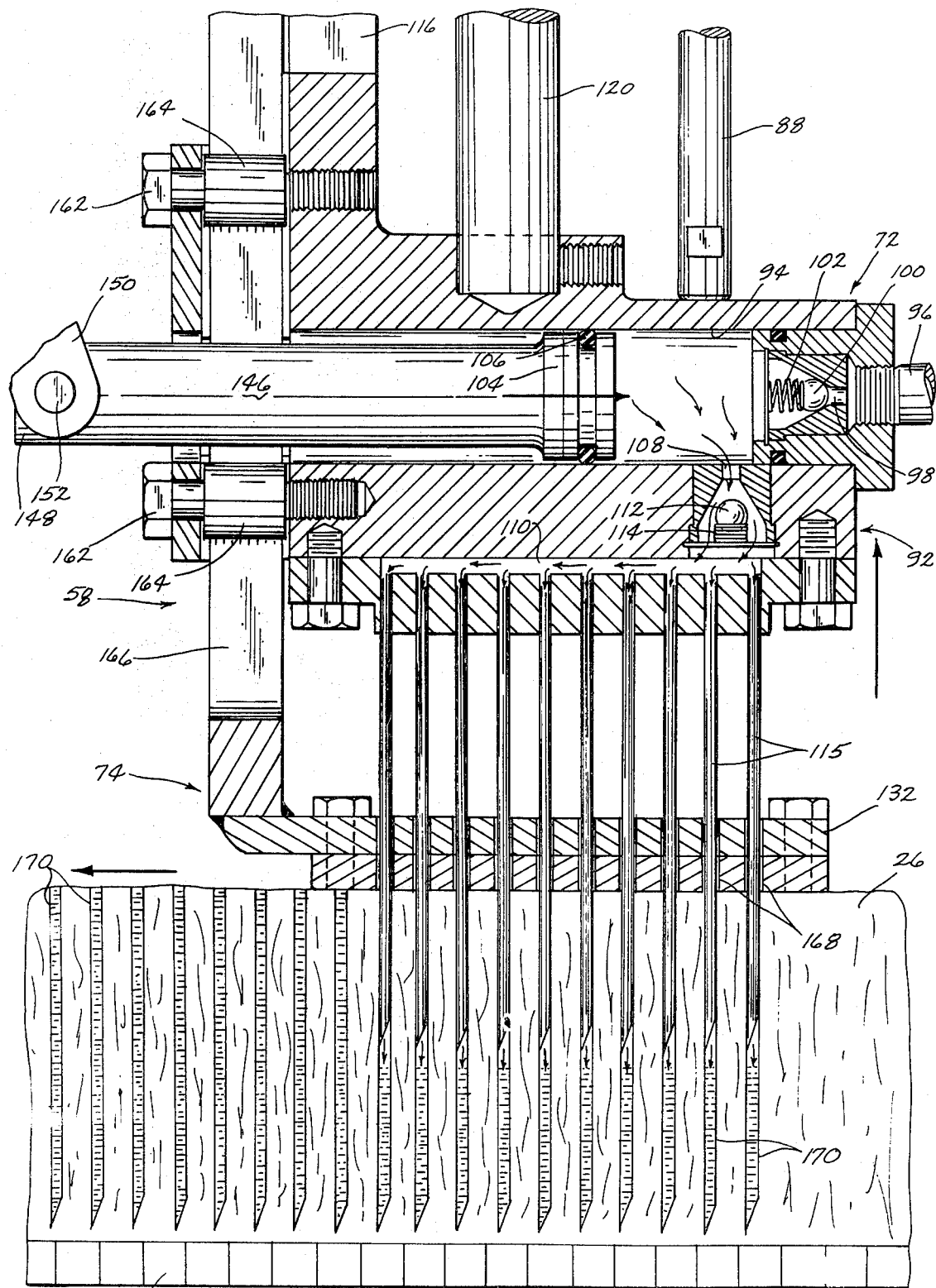
FIG. 8 is an enlarged partial sectional view of the metering cylinder and the needles of the present invention.

FIG. 5 illustrates the needles in their lowest position. In FIG. 8, the needles are shown moving upwardly from their lowermost position, thereby leaving a plurality of cavities 170 in the meat. As needles 115 begin moving upwardly with the upward stroke of arms 52, cam roller 156 begins moving upwardly in slot 140, and the movement of piston 104 is directed to the right so as to begin moving from the position shown in FIG. 5 to the position shown in FIG. 3. This movement of piston 104 forces the fluid within bore 94 outwardly through outlet opening 108 against check valve 112 as viewed in FIG. 8. The fluid moves downwardly through opening 108 into manifold 110 and thence downwardly and out through the lower ends of needles 115. Because the amount of fluid metered into cylindrical bore 94 is substantially equal to the volume of the cavities formed by needles 115, the amount of fluid injected into cavities 170 is metered exactly so that there is no overflow when the needles are fully withdrawn from the meat.

If the needles 115 encounter a bone or obstruction 172 as shown in FIG. 7, their downward movement is stopped, and therefore the relative movement between needle assembly 72 and stripper assembly 74 is less than the relative movement between these two components illustrated in FIG. 5. Consequently, the movement of piston 104 to the left is less when bone 172 is encountered than would be the case if the needles 115 extend downwardly to their full lowermost position. The amount of fluid within bore 94 at any given time is always equal to the volume of the cavities of the needles formed in the meat, and therefore exact metering is provided in the case of encountering a bone, such as shown in FIG. 7.

Figure 2:
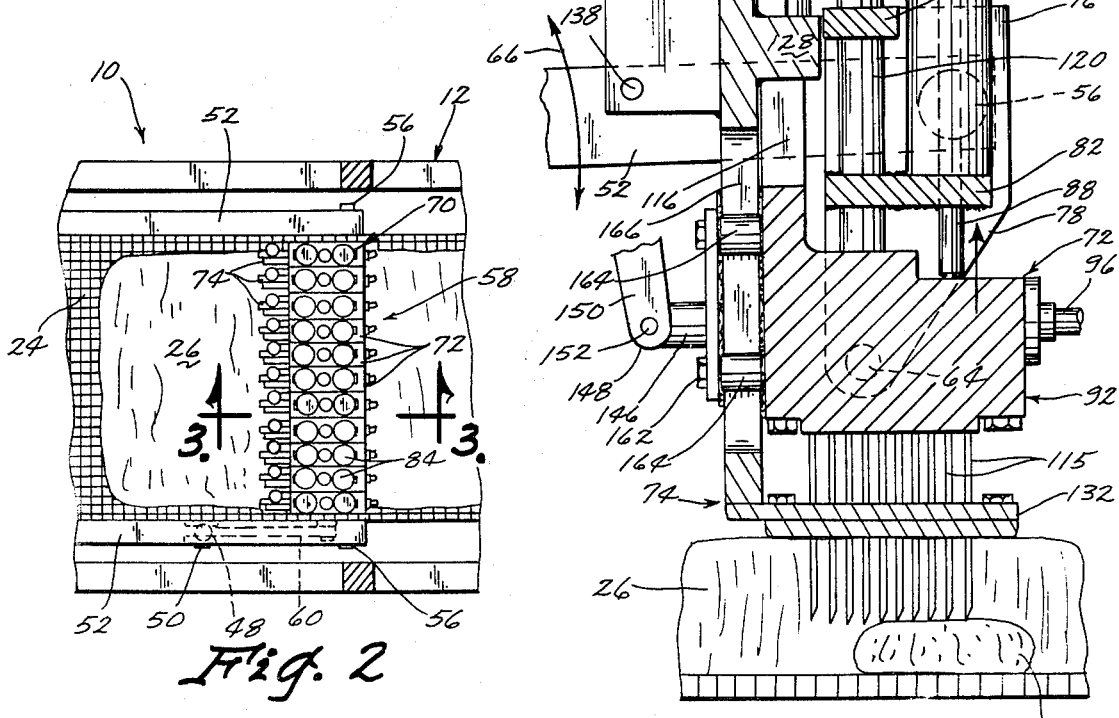
FIG. 2 is a sectional view taken along line 2—2 of FIG. 1.

As illustrated in FIG. 2, a plurality of needle assemblies 72 and stripper assemblies 74 are mounted for independent movement along ram assembly 70, so that should the needles 115 of one needle assembly strike a bone, and the needles 115 of another needle assembly not strike a bone, the two needle assemblies can move independently of one another. Thus, the depth of the needles will only be short at the point where a bone 172 is encountered, and if no bones are present in the remainder of the cross section of the meat, the other needle assemblies will penetrate to the full depth.

While conventional devices cause the lean meat to substantially swell as it is injected with fluid, the present invention substantially eliminates such swelling.

From the foregoing, it can be seen that the device accomplishes at least all of its stated objectives.

I claim:

1. The method of injecting fluid into a food product selected from meat, fish or poultry, comprising, injecting a plurality of needles into said food product to create a plurality of cavity voids in said product defined by the shape of the portion of each needle that penetrates said product, and injecting a metered quantity of fluid through said needles into said cavity voids while said needles are within said food product, said quantity of fluid being metered to be equal substantially to the volume of said cavity voids so as to uniformly inject said fluid into the fat and lean portions of said food product without creating an immediate migration of fluid through said lean portions more than through said fat portions at the time of injection.

2. The method of claim 1 wherein fluid is introduced into said cavity voids through said needles as they are being withdrawn from said food product.

3. A method of injecting fluid into a food product selected from meat, fish or poultry, comprising, injecting a plurality of needles into said food product to create a plurality of cavity voids in said product defined by the shape of the portion of each needle that penetrates said product, automatically metering a quantity of fluid having a volume approximately equal to the volume of said cavity voids formed by said needles; injecting said metered quantity of fluid through said needles into said cavity voids while said needles are within said food product whereby the quantity of fluid injected into said cavity voids is approximately equal to the volume of said cavity voids formed by said needles so as to uniformly inject said fluid into the fat and lean portions of said food product without creating an immediate migration of fluid through said lean portions more than through said fat portions at the time of injection.

4. A method according to claim 3 wherein said needles are injected into said food product in a downward stroke and said needles are withdrawn from said food product in an upward stroke, said metering of fluid being accomplished during said downward stroke.

5. A method according to claim 4 wherein said injecting of fluid through said needles is accomplished only during said upward stroke.

6. A method according to claim 4 comprising adjusting the quantity of fluid metered in response to variations in the depth of penetration of said needles into said food product.

7. A method according to claim 6 comprising stopping the downward penetration of said needles before completion of said downward stroke in response to said needles striking a hard object within said food product, adjusting the quantity of fluid metered to be approximately equal to the reduced volume of said cavity voids which results from said stopping of said downward penetration of said needles.

8. A method according to claim 3 comprising sensing the depth to which said needles penetrate said food product, and adjusting the amount of fluid metered according to the depth of penetration sensed so that said metered fluid will have a volume approximately equal to the volume of said voids regardless of how deep said needles penetrate said food product.

* * * * *